United States Patent [19]

Trauth et al.

[11] Patent Number: 5,171,328
[45] Date of Patent: Dec. 15, 1992

[54] STABILIZER-CONTAINING WOOD STAINS

[75] Inventors: Hubert Trauth, Dudenhofen; Christos Vamvakaris, Kallstadt, both of Fed. Rep. of Germany

[73] Assignee: BASF Aktiengesellschaft, Ludwigshafen, Fed. Rep. of Germany

[21] Appl. No.: 770,865

[22] Filed: Oct. 4, 1991

[30] Foreign Application Priority Data

Oct. 4, 1990 [DE] Fed. Rep. of Germany ....... 4031279

[51] Int. Cl.$^5$ .......................... D06P 3/00; C09B 67/00
[52] U.S. Cl. ............................................ 8/402; 8/568; 8/681; 8/938
[58] Field of Search ............................ 8/402, 938, 568

[56] References Cited

U.S. PATENT DOCUMENTS

| | | | |
|---|---|---|---|
| 2,867,493 | 9/1959 | Nack | 8/402 |
| 4,648,884 | 3/1987 | Koci | 8/402 |
| 4,769,457 | 9/1988 | Helinig et al. | 544/180 |
| 4,927,925 | 5/1990 | Cantatore et al. | 540/598 |
| 4,943,391 | 7/1990 | Aumueller et al. | 252/401 |
| 4,976,889 | 12/1990 | Aumueller et al. | 252/403 |

Primary Examiner—A. Lionel Clingman
Attorney, Agent, or Firm—Oblon, Spivak, McClelland, Maier & Neustadt

[57] ABSTRACT

Wood stains contain in addition to a colorant and a solvent at least one stabilizer against the action of light, oxygen and heat on the wood treated with the wood stain, said stabilizer containing at least one structural element of the formula I

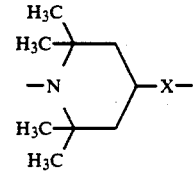

where X is oxygen or nitrogen.

5 Claims, No Drawings

STABILIZER-CONTAINING WOOD STAINS

The present invention relates to wood stains which in addition to a colorant and a solvent contain at least one stabilizer against the action of light, oxygen and heat on the wood which has been treated with the wood stain, said stabilizer containing at least one structural element of the formula I

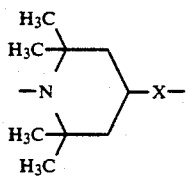

where X is oxygen or nitrogen.

For the purposes of the present invention wood stains are, in line with Ullmanns Encyklop/uml/a die der technischen Chemie, 4th edition, volume 12, page 681 (1), formulations of dyes and color pigments which ar present dissolved or suspended in an organic solvent, preferably an alcohol, and may contain small amounts of customary additives such as binders. They are used for treating, specifically coloring, wood.

The wood which has been treated with these wood stains is known to degrade or even disintegrate very rapidly under the action of light, oxygen and heat. As an outward sign of this degradation or disintegration, the colorant present in or on the surface of the wood will usually turn yellow or become discolored in some other way. Hitherto there has been no effective remedy.

It is an object of the present invention to provide stabilizers which will ensure satisfactory protection of the treated wood.

We have found that this object is achieved by the stabilizers with at least one structural element of the formula I defined at the beginning.

Polyalkylpiperidinyl groups of formula I are known as active moieties of ultraviolet absorbers and stabilizers for plastics and coatings, for example from EP-A-316 582 (2) and EP-A-213 570 (3). It is all the more surprising that such compounds, when used in wood stains, also show excellent stabilizing effects on the wood treated therewith.

The stabilizers with structural elements of the formula I which are usable according to the present invention are organic compounds which can also exist in oligomeric or polymeric form. They must have sufficient light, heat and storage stability and be sufficiently compatible with wood materials. They must also have a minimum level of solubility in the solvents used for wood Particularly advantageous stabilizers are the following classes of substances:

(a) 4-formylaminopiperidine derivatives of the formula

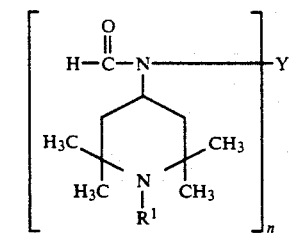

where
n is 1 or 2,
$R^1$ is hydrogen, $C_1-C_4$-alkyl, allyl, hydroxymethyl, $\beta$-hydroxyethyl, $C_1-C_4$-acyl, benzoyl or benzyl, and for n=1
Y is $C_1-C_{18}$-alkyl, which may be interrupted by from 1 to 4 nitrogen or oxygen atoms, $C_3-C_{12}$-cycloalkyl, phenyl, which may be $C_1-C_4$-alkyl-, fluorine-, chlorine-, bromine-, $C_1-C_4$-alkoxy-, methylenedioxy-or di-$C_1-C_4$-alkylamino-substituted, a radical of the formula

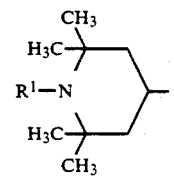

or $C_7-C_{12}$-phenylalkyl which may be additionally substituted on the phenyl nucleus by $C_1-C_4$-alkyl, fluorine, chlorine, bromine, $C_1-C_4$-alkoxy, methylenedioxy or di-$C_1-C_4$-alkylamino, or for n =2
Y is $C_2-C_8$-alkylene, $C_5-C_{18}$-cycloalkylene, phenylene, $C_8-C_{15}$-phenylalkylene or $C_4-C_{18}$-alkylene which is interrupted by from 1 to 4 oxygen or nitrogen atoms, or (b) glycoloril derivatives of the formula Ib

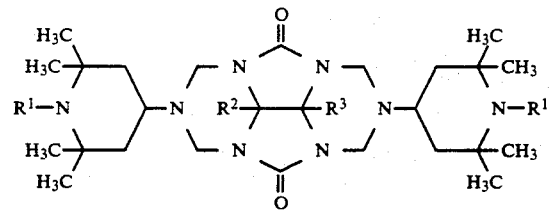

where
$R_2$ and $R_3$ are each hydrogen, $C_1-C_4$-alkyl, carbomethxy, carboethoxy, benzyl or phenyl, or (c) mono- or dicarboxylic esters of the formula Ic or Id

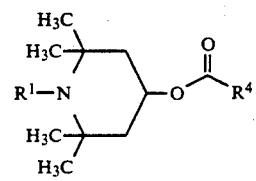

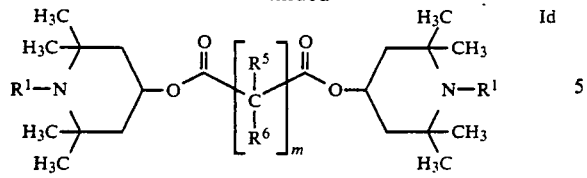

Id where

R⁴ is C₁–C₁₈-alkyl which may be interrupted by from to 4 nitrogen or oxygen atoms, C₃–C₁₂ -cycloalkyl, phenyl which may be C₁–C₄-alkyl-, fluorine-, chlorine-, bromine- C methylenedioxy- or di-C₁–C₄-alkylamino-substituted, or C₇–C₁₂-phenylalkyl which may be additionally substituted on the phenyl nucleus by C₁–C₄-alkyl, fluorine, chlorine, bromine, C₁–C₄-alkoxy, methylenedioxy or di-C₁–C₄-alkylamino, R⁵ and R⁶ are each hydrogen, C₁–C₄-alkyl or C₇–C₁₂-phenylalkyl which may be additionally substituted on the phenyl moiety by C₁–C₄-alkyl, chlorine, bromine, hydroxyl or cyano, and m is from 1 to 12, and compounds Id may be in the form of a polymer.

R¹ is for example allyl, hydroxymethyl, β-hydroxyethyl, formyl, propionyl, butyryl, benzoyl, but in particular C₁–C₄-alkyl such as methyl, ethyl, n-propyl, iso-propyl, n-butyl or iso-butyl, and also acetyl and hydrogen. The most preferred meanings are hydrogen, methyl and acetyl.

C₁–C₁₈-alkyl Y is for example methyl, ethyl, n-propyl, iso-propyl, n-butyl, iso-butyl, n-pentyl, iso-pentyl, decyl, dodecyl, iso-tridecyl, tetradecyl, hexadecyl, octadecyl, pivalyl, 3,3-dimethyl-2-butyl, neopentyl, 4-methyl-2-pentyl and in particular n-hexyl, n-heptyl, n-octyl, 2-ethylhexyl, nonyl and iso-nonyl.

C₂–C₁₈-alkyl Y which is interrupted by from 1 to 4, preferably 1 or 2, ether oxygen or nitrogen atoms can be for example: —(CH₂)₃N(CH₃)₂, —(CH₂)₃N(C₂H₅)₂, —(CH₂)₃—OCH₃, —(CH₂)₃—O—CH(CH₃)₂, —(CH₂)₂O(CH₂)₂—OH, —(CH₂)₄—N(CH₃)₂, —(CH₂)₂—N[CH(CH₃)₂]₂, —(CH₂)₂—N—(C₂H₅)₂, —(CH₂)₂N(CH₃)₂, —(CH₂)₂—OCH₃ and —(CH₂)₂—OCH₂CH₃.

Cycloalkyl Y is for example cyclopropyl, cyclobutyl, cyclopentyl, methylcyclohexyl, cycloheptyl, cyclooctyl, cyclododecyl or in particular cyclohexyl.

Examples of monosubstituted, disubstituted or trisubstituted phenyl Y are methoxyphenyl, toluene, xylene, trimethylphenyl, ethylphenyl, cumyl, fluorophenyl, chlorophenyl, bromophenyl, methylenedioxyphenyl and dimethylaminophenyl, the substituents being in the o-, m- or p-position.

C₇–C₁₂-phenylalkyl Y which may be additionally monosubstituted, disubstituted or trisubstituted on the phenyl nucleus is for example benzyl, methoxybenzyl, methylbenzyl, ethylbenzyl, isopropylbenzyl, tert-butylbenzyl, trimethylbenzyl, fluorobenzyl, chlorobenzyl, bromobenzyl, methylenedioxybenzyl, β-phenylethyl, β-(tert-butylphenyl)ethyl, γ-phenylpropyl, β-(tert-butylphenyl)propyl, δ-phenylbutyl, ω-phenylhexyl or dimethylaminobenzyl, any substitutents on the phenyl nucleus being in the o-, m- or p-position.

C₂–C₈-alkylene Y and C₅–C₁₈-cycloalkylene Y can be for example:

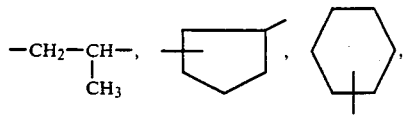

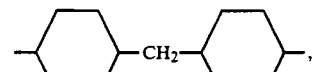

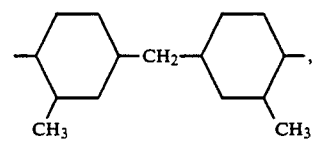

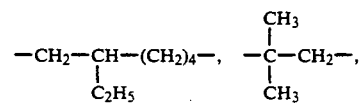

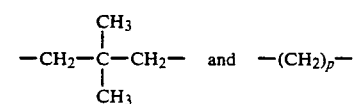

with p being from 2 to 8.

Of these, 1,2-ethylene, 1,3-propylene, 1,4-butylene and 1,6-hexamethylene are preferred.

Phenylene Y and C₈–C₁₅-phenylalkylene Y can be for example:

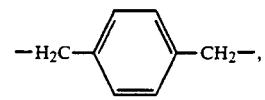

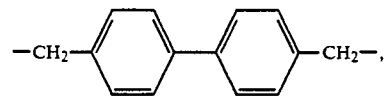

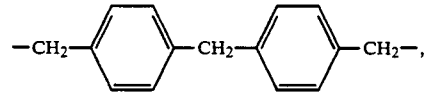

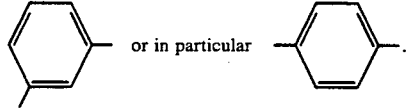

C₄–C₁₈-alkylene Y which is interrupted by from 1 to 4, preferably from 1 to 3, ether oxygen or nitrogen atoms can be for example:

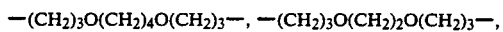

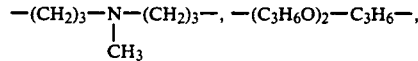

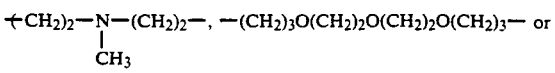

-continued

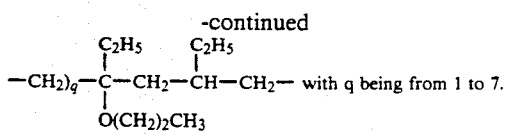 with q being from 1 to 7.

If a stabilizer molecule contains a plurality of polyalkylpiperidinyl groups, the $R^1$ moieties present therein may be identical or different.

$R^2$ and $R^3$ are each preferably ethyl, benzyl, phenyl, carbomethoxy, carboethoxy and in particular hydrogen and methyl.

$R^4$ has the same meanings as the monovalent radical Y, except for the radical of the formula

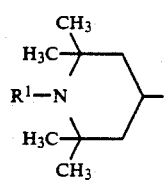

Examples of $R^5$ and $R^6$ besides hydrogen are methyl, ethyl, n-propyl, n-butyl, benzyl, β-phenylethyl, p-methylbenzyl, p-chlorobenzyl, p-bromobenzyl, p-cyano-benzyl, p-hydroxybenzyl and 3,5-di-tert-butyl-4-hydroxybenzyl; preference is given to n-butyl, 3,5-di-tert-butyl-4-hydroxybenzyl and in particular hydrogen.

The number m of unsubstituted or $R^5$- and $R^6$-substituted methylene bridge members in the dicarboxylic acid esters Id is preferably from 1 to 10, in particular from 1 to 8. If substituents are present, preferably only one carbon atom in the alkylene bridge is thus equipped; substituents may be present in particular when m is 1.

In a preferred embodiment, the wood stains additionally contain one or more UV absorbers selected from the classes of the 2-(2'-hydroxyphenyl)benzo-triazoles, 2-(2'-hydroxyphenyl)-1,3,5-triazines, 2-hydroxybenzophenones, imidazole-2-carboxanilides, oxalodiamides, acrylates which are phenyl- or hetaryl-substituted in the 3-position, and the heterocyclic amidine derivatives.

Specific examples of such UV absorbers are:

2-(2'-hydroxyphenyl)benzotriazoles the 5'-methyl, 3', 5'-di-tert-butyl, 5'-tert-butyl, 5'-(1'',1'',3'',3''-tetramethylbutyl), 5-chloro-3',5'-di-tert-butyl- 5-chloro-3'-tert-butyl-5'-methyl, 3'-sec-butyl-5'-tert-butyl, 4'-octoxy, 3',5'-di-tert-amyl or 3',5'-bis-α,α-dimethylbenzyl derivative;

2-(2'-hydroxyphenyl)-1,3,5-triazines: 2,4,6-tris (2,-hydroxy-4'-octyloxyphenyl)-1,3,5-triazine, 2-(2'-hydroxy-4'-octyloxyphenyl)-4,6-bis(2',4'-di-methylphenyl)-1,3,5-triazine, 2-(2',4'-dihydroxy-phenyl)-4,6-bis(2',4'-dimethylphenyl)-1,3,5-tria-zine, 2,4-bis(2'-hydroxy-4'-propyloxyphenyl)-6-(2',4'-dimethylphenyl)-1,3,5-triazine, 2-(2'-hydroxy-4'-octyloxyphenyl)-4,6-bis(4'-methylphenyl)-1,3,5-triazine, 2-(2'-hydroxy-4'-dodecyloxyphenyl)-4,6-bis(2',4'-dimethylphenyl)-1,3,5-triazine; 2-hydroxybenzophenones: the 4-hydroxy, 4-methoxy, 4-octyloxy, 4-decyloxy, 4-dodecyloxy, 4-benzyloxy, 2,4,4'-trihydroxy or 2'-hydroxy-4,4'-dimethoxy derivative;

imidazole-2-carboxanilides: benzimidazole-2-carboxanilides, such as the 4'-methoxy, 4'-ethoxy, 4'-propoxy, 4'-butoxy, 4'-methyl, 4'-ethyl, 4'-propyl or 4'-isopropyl derivative and the unsubstituted compound;

oxalodiamides: 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2-ethyloxanilide, N,N,-bis-(3-dimethylaminopropyl)-oxalamide, 2-ethoxy-5-tert-butyl-2-ethyloxanilide and its mixture with 2-ethoxy-2'-ethyl-5,4'-di-tert-butyloxanilide, mixtures of o- and p-methoxy- and also of o- and p-ethoxy-disubstituted oxanilides;

3-phenyl- or 3-hetaryl-substituted acrylates: ethyl or isooctyl o-cyano-β,β-diphenylacrylate, methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline, 2-ethylhexyl 2-cyano-3,3-diphenylacrylate and 2-ethyl 2-cyano-3,3-diphenylacrylate;

heterocyclic amidine derivatives: compounds of the formulae

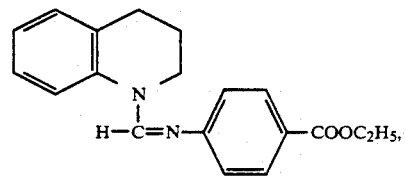

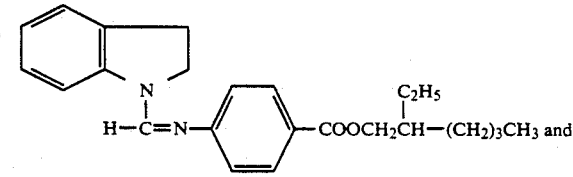

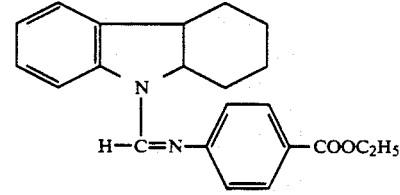

Imidazole-2-carboxanilides of the type mentioned are described in more detail in EP-A-284 828 (4) and heterocyclic amidine derivatives of the type mentioned are described in earlier German Patent Application P 39 16 494 (5).

Of these UV absorbers preference is given to compounds of the classes of the 2-(2'-hydroxyphenyl)-benzotriazoles and in particular the 2-hydroxybenzo-phenones and the imidazole-2-carboxanilides.

The wood stains of the present invention preferably contain as the colorant component a customary amount of a solvent dye or an alcohol-soluble acid dye which is chemically an azo or disazo dye. This dye can also be a metal complex dye. If acid groups are present, it may be in the form of an amine salt.

In general, the solvent and alcohol-soluble acid dyes are present in the wood stains in a state of complete or almost complete solution.

In addition, however, it is also possible to use other colorants such as disperse dyes or color pigments, provided the lower or complete absence of solubility of the colorant does not lead to technical problems with the application of the resulting suspensions.

Examples of highly suitable solvent dyes or alcohol-soluble acid dyes are the following azo or disazo dyes with their Colour Index designations: Solvent Yellow 82, 'Solvent Orange 54, Solvent Orange 56, Solvent Red 122, Solvent Red 160, Solvent Blue 70 and Acid Red 14.

The solvents used for the wood stains of the present invention are polar organic solvents such as carboxylic acids, eg. formic acid, acetic acid or propionic acid, including solid carboxylic acids, eg. oxalic acid or maleic acid, besides other solvents, esters, eg. ethyl acetate or methyl butyrate, ketones, eg. acetone or butanone, ethers, eg. ethylene glycol dimethyl ether, dioxane or tetrahydrofuran, carboxamides, eg. formamide or dimethylformamide, but in particular monohydric or polyhydric aliphatic alcohols which may additionally contain ether oxygen atoms, eg. methanol, ethanol, isopropanol, n-propanol, n-butanol, 1-methoxy-2-propanol, ethylene glycol, ethylene glycol monomethyl ether or diethylene glycol monomethyl ether, and mixtures thereof. Particular preference is given to ethanol, isopropanol and 1-methoxy-2-propanol and mixtures thereof. The polar solvent component may also include water, for example in a proportion of up to about 50% by weight, based on the solvent mixture, provided that a minimum level of solvent power for the colorant and, as the case may be, the stabilizer system is ensured.

The wood stains of the present invention contain the stabilizers described alone or a mixture of the stabilizers described and the abovementioned UV absorbers in an amount of from 0.05 to 10% by weight, preferably from 0.1 to 5% by weight, in particular from 0.2 to 2.5% by weight, based on the total amount of wood stain.

Suitable wood for treatment with the wood stains of the present invention comprises primarily shaped wooden articles with extended surfaces, for example boards, plywood and chipboard, which may be veneered, carved articles made of wood and for example furniture glued, nailed or screwed together from wooden components, but also wood in finely divided form, for example wood shavings or sawdust. Depending on the consistency and type of wood and the conditions under which it has been treated with the wood stain, the colorant can be directly on the surface of the wood material or be deep on the inside.

The wood stains of the present invention are applied to the wood in a conventional manner, for example by dipping the wood into baths of wood stain. The treatment time can be up to several hours, and the temperature of the wood stain baths ranges in general from about 20 to about 100° C., depending on the solvent system used.

After the treatment has ended, the wooden articles are in general air dried at room temperature; but it is also possible to employ more severe drying methods, for example elevated temperatures in a through-circulation cabinet.

The wood stains of the present invention can be used for treating any customary type of wood, eg. pine, spruce, fir, oak, ash, beech, maple, walnut, pearwood, teak, mahogany, chestnut, birch, larch, hazelnut, limewood, willow, poplar, elm, Scots pine, plane tree or aspen.

The present invention further provides a mixture of stabilizers having at least one polyalkylpiperidinyl group of the formula I and UV absorbers of the type mentioned in a weight ratio of from 5:1 to 1:5, preferably from 2:1 to 1:2, in particular 1:1, for stabilizing wood which has been treated with wood stains against the action of light, oxygen and heat.

This mixture is preferably added to the wood stains before the treatment of the wood, so that the stabilizer system can then be applied together with the colorant, ensuring uniform distribution of the stabilizer components with the colorant. However, the wood can also be brought into contact with the novel mixture of stabilizers and UV absorbers separately, advantageously in dissolved form, before or after treatment with the wood stain to bring about a layer distribution.

The wood stains of the present invention, in particular those which contain a mixture of the stabilizers described and UV absorbers, are highly suitable for permanently coloring wood of any consistency and grade. The wood thus treated is virtually immune to yellowing or discoloration, as is documented by appropriate light fastness measurements.

EXAMPLES

The wood stains used were prepared by the following method:

1 g of the dye indicated in the table was dissolved in a mixture of 630 g of ethanol and 185 g of 1-methoxy-2-propanol by gentle heating. The amounts of stabilizers and UV absorbers indicated in the table were then added at room temperature. Stabilizers and UV absorbers dissolved completely.

The following stabilizers (A to C) and UV absorbers (D to H) were used:

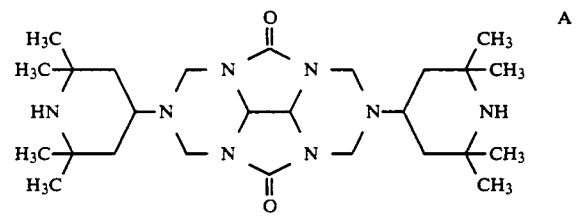

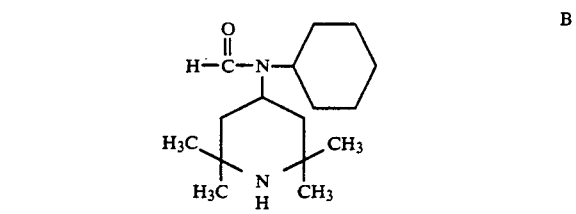

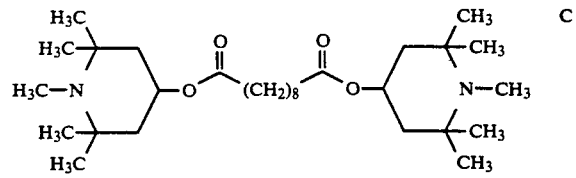

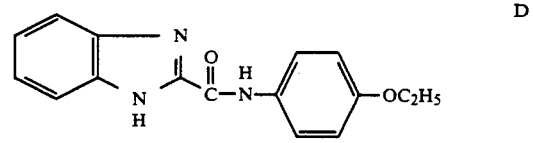

-continued

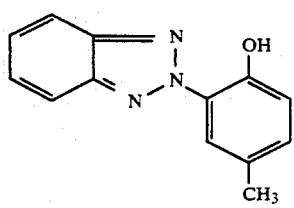
E

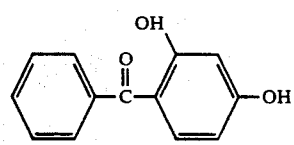
F

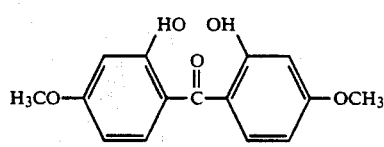
G

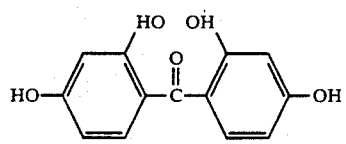
H

The wood was colored by the following method:
Commercial veneered boards of wood were dipped into a bath of wood stain and, to avoid evaporation losses, kept in a sealed vessel at 70–75° C. for 4 hours. The boards were then air dried at room temperature.

The colored boards were tested in the Suntest® accelerometer from Heraeus for 96 hours. Then the light fastness values of the colored wood surfaces were determined. The controls used were veneered wood boards treated in the same way with the corresponding wood stains but without stabilizers and UV absorbers and then exposed in the light fastness testing machine.

The light fastness indicates the degree to which the colorant changes on exposure to artificial light. The light fastness is rated on a scale from 1 to 8, with 1 denoting the worst performance and 8 the best performance. A light fastness rating of 8 indicates that the color strength of the colorant is unchanged, while a rating of 1 indicates that the colorant has been virtually completely destroyed.

The following table shows the results of the tests:

TABLE

Light fastness properties of colored veneered boards of wood

| Example No. | Stabilizer/ UV absorber | Amount [g] | Concentration [% by wt.] | Dye | Light fastness rating |
|---|---|---|---|---|---|
| 1 | A | 2.5 | 0.3 | Solvent Red 122 | 3–4 |
| 2 | A | 5 | 1.2 | Solvent Red 122 | 4–5 |
|  | D | 5 |  |  |  |
| 3 | A | 10 | 2.4 | Solvent Red 122 | 5 |
|  | F | 10 |  |  |  |
| 4 | A | 5 | 1.2 | Solvent Red 122 | 4 |
|  | G | 5 |  |  |  |
| 5 | A | 5 | 1.2 | Solvent Red 122 | 3–4 |
|  | H | 5 |  |  |  |
| 6 | B | 5 | 1.2 | Solvent Red 122 | 5 |
|  | D | 5 |  |  |  |
| 7 | B | 5 | 1.2 | Solvent Red 122 | 4–5 |
|  | F | 5 |  |  |  |
| Comparison | — | — | — | Solvent Red 122 | 1–2 |
| 8 | A | 10 | 2.4 | Solvent Red 160 | 4 |
|  | F | 10 |  |  |  |
| Comparison | — | — | — | Solvent Red 160 | 1 |
| 9 | A | 10 | 2.4 | Solvent Yellow 82 | 3 |
|  | F | 10 |  |  |  |
| Comparison | — | — | — | Solvent Yellow 82 | 1–2 |
| 10 | A | 10 | 2.4 | Solvent Orange 54 | 3–4 |
|  | F | 10 |  |  |  |
| Comparison | — | — | — | Solvent Orange 54 | 2–3 |
| 11 | A | 10 | 2.4 | Solvent Orange 56 | 3 |
|  | F | 10 |  |  |  |
| 12 | C | 10 | 2.4 | Solvent Orange 56 | 3–4 |
|  | E | 10 |  |  |  |
| Comparison | — | — | — | Solvent Orange 56 | 2 |
| 13 | C | 10 | 2.4 | Solvent Blue 70 | 2–3 |
|  | E | 10 |  |  |  |
| Comparison | — | — | — | Solvent Blue 70 | 2 |

TABLE-continued

Light fastness properties of colored veneered boards of wood

| Example No. | Stabilizer/ UV absorber | Amount [g] | Concentration [% by wt.] | Dye | Light fastness rating |
| --- | --- | --- | --- | --- | --- |
| 14 | A | 5 | 0.6 | Acid Red 14 | 3 |
| 15 | A<br>D | 5<br>5 | 1.2 | Acid Red 14 | 3–4 |
| 16 | A<br>G | 5<br>5 | 1.2 | Acid Red 14 | 3–4 |
| 17 | A<br>H | 5<br>5 | 1.2 | Acid Red 14 | 3–4 |
| 18 | B<br>D | 5<br>5 | 1.2 | Acid Red 14 | 3–4 |
| 19 | B<br>F | 5<br>5 | 1.2 | Acid Red 14 | 3–4 |
| Comparison | — | — | — | Acid Red 14 | 1 |

We claim:

1. A wood stain containing in addition to a colorant and a solvent at least one stabilizer against the action of light, oxygen and hat on the wood which has been treated with the wood stain, said stabilizer containing at least on structural element of the formula I

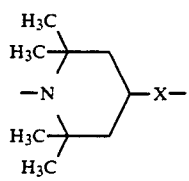

where X is oxygen or nitrogen, wherein the colorant is a solvent dye or an alcohol-soluble acid dye, in either case from the group of the azo or disazo dyes.

2. A wood stain as claimed in claim 1, wherein the stabilizer is (a) a 4-formylaminopiperidine derivative of the formula Ia

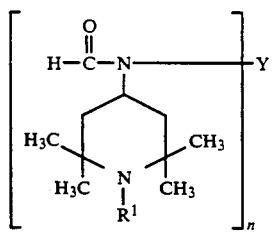

where
n is 1 or 2,
$R^1$ is hydrogen, $C_1$–$C_4$-alkyl, allyl, hydroxymethyl, β-hydroxyethyl, $C_1$–$C_4$-acyl, benzoyl or benzyl, and for n—1
Y is $C_1$–$C_{18}$-alkyl, which may be interrupted by from 1 to 4 nitrogen or oxygen atoms, $C_3$–$C_{12}$-cycloalkyl, phenyl, which may be $C_1$–$C_4$-alkyl-, fluorine-, chlorine-, bromine-, $C_1$–$C_4$-alkoxy-, methylenedioxy- or di-$C_1$–$C_4$ -alkylamino-substituted, a radical of the formula

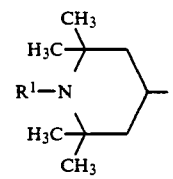

or $C_7$–$C_{12}$-phenylalkyl which may be additionally substituted on the phenyl nucleus by $C_1$–$C_4$-alkyl, fluorine, chlorine, bromine, $C_1$–$C_4$-alkoxy, methylenedioxy or di-$C_1$–$C_4$-alkylamino, or for n=2
Y is $C_2$–$C_8$-alkylene, $C_5$–$C_{18}$-cycloalkylene, phenylene, $C_8$–$C_{15}$-phenylalkylene or $C_4$–$C_{18}$-alkylene which is interrupted by from 1 to 4 oxygen or nitrogen atoms, or (b) a glycoluril derivative of the formula Ib

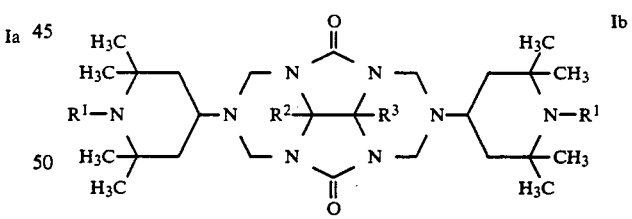

where $R^2$ and $R^3$ are each hydrogen, $C_1$–$C_4$-alkyl, carbomethoxy, carboethoxy, benzyl or phenyl, or (c) a mono- or dicarboxylic ester of the formula Ic or Id

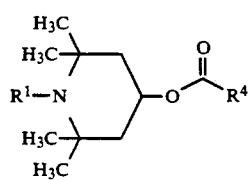

-continued

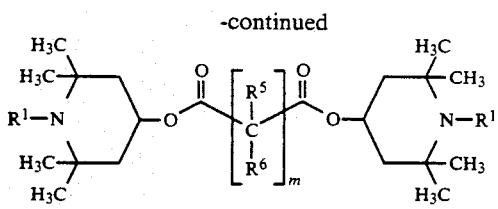

where
R$^4$ is C$_1$–C$_{18}$-alkyl which may be interrupted by from 1 to 4 nitrogen or oxygen atoms, C$_3$–C$_{12}$-cycloalkyl, phenyl which may be C$_1$–C$_4$-alkyl-, fluorine-, chlorine-, bromine-, C$_1$–C$_4$-alkoxy-, methylenedioxy- or di-C$_1$–C$_4$-alkylamino-substitute, or C$_7$–C$_{12}$-phenylalkyl which may be additionally substituted on the phenyl nucleus by C$_1$–C$_4$-alkyl, fluorine, chlorine, bromine, C$_1$–C$_4$-alkoxy, methylenedioxy or di-C$_1$–C$_4$-alkylamino,
R$^5$ and R$^6$ are each hydrogen, C$_1$–C$_4$-alkyl or C$_7$–C$_{12}$-phenylalkyl which may be additionally substituted on the phenyl moiety by C$_1$–C$_4$-alkyl, chlorine, bromine, hydroxyl or cyano, and
m is from 1 to 12, and compound Id may be in the form of a polymer.

3. A wood stain as claimed in claim 1, additionally containing one or more UV absorbers selected from the classes of the 2-(2'-hydroxyphenyl)benzotriazoles, 2-(2'-hydroxyphenyl)-1,3,5-triazines, 2-hydroxybenzophenones, imidazole-2-carboxanilides, oxalodiamides, acrylates which are phenyl- or hetaryl-substituted in the 3-position, and the heterocyclic amidine derivatives.

4. A wood stain as claimed in claim 1, containing the stabilizer alone or a mixture of stabilizers and UV absorbers selected from the classes of the 2-(2'-hydroxyphenyl)benzotriazoles, 2-(2'-hydroxyphenyl)-1,3,5-triazines, 2-hydroxybenzophenones, imidazole-2-carboxanilides. oxalodiamides, acrylates which are phenyl- or hetary-substituted in the 3-position, and the heterocyclic amidine derivatives in an amount of from 0.05 to 10% by weight, based on the total amount of wood stain.

5. A mixture of stabilizers as set forth in claim 1 and UV absorbers selected from the classes of the 2-(2'-hydroxypheny)benzotriazoes, 2-(2'-hydroxyphenyl)-1,3,5-triazines, 2-hydroxybenzophenones, imidazole-2-carbox-anilides, oxalodiamides acrylates which are phenyl- or hetary-substituted in the 3-position and the heterocyclic amidine derivatives in a weight ratio of from 5:1 to 1:5 for stabilizing wood which has been treated with a wood stain against the action of light, oxygen and heat.

* * * * *